United States Patent
Kim et al.

(10) Patent No.: US 8,018,482 B2
(45) Date of Patent: Sep. 13, 2011

(54) THREE-DIMENSIONAL DISPLAY DEVICE AND DRIVING METHOD THEREOF

(75) Inventors: Beom-Shik Kim, Yongin-si (KR);
Jang-Doo Lee, Yongin-si (KR);
Hyoung-Wook Jang, Yongin-si (KR);
Hui Nam, Yongin-si (KR);
Myoung-Seop Song, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1411 days.

(21) Appl. No.: 11/504,887

(22) Filed: Aug. 15, 2006

(65) Prior Publication Data
US 2007/0046564 A1   Mar. 1, 2007

(30) Foreign Application Priority Data

Aug. 25, 2005   (KR) .................. 10-2005-0078227

(51) Int. Cl.
*H04N 13/00* (2006.01)
*H04N 13/04* (2006.01)
*G09C 5/00* (2006.01)
*G09G 5/00* (2006.01)

(52) U.S. Cl. ............. 348/42; 348/51; 345/6; 359/464
(58) Field of Classification Search ............. 348/42
See application file for complete search history.

(56) References Cited

U.S. PATENT DOCUMENTS

| 5,315,377 A * | 5/1994 | Isono et al. ............ 348/51 |
| 6,124,920 A | 9/2000 | Moseley et al. | |
| 7,215,475 B2 * | 5/2007 | Woodgate et al. ............ 359/624 |
| 2003/0011884 A1 * | 1/2003 | Van Berkel ............ 359/464 |
| 2004/0263698 A1 * | 12/2004 | Nam et al. ............ 349/6 |

FOREIGN PATENT DOCUMENTS

| CN | 1197389 C | 4/2005 |
| EP | 0 822 441 A2 | 2/1998 |
| EP | 1 250 013 A1 | 10/2002 |
| JP | 03-119889 | 5/1991 |
| JP | 2005-134663 | 5/2005 |
| KR | 10-2004-0058843 | 7/2004 |
| KR | 10-0477638 | 3/2005 |
| KR | 10-2005-0062615 | 6/2005 |

OTHER PUBLICATIONS

European Search Report dated Nov. 15, 2007, for Euroepan application 06254414.3, indicating relevance of cited references in this IDS.
H. Isono et al., *Autostereoscopic 3-D Display Using LCD-Generated Parallax Barrier*, Electronics and Communications in Japan, Part II, vol. 76, No. 7, Jul. 1993, pp. 77-83.

(Continued)

*Primary Examiner* — Christopher Kelley
*Assistant Examiner* — Hee-Yong Kim
(74) *Attorney, Agent, or Firm* — Christie, Parker & Hale, LLP

(57) ABSTRACT

A three-dimensional display device includes an image display unit and a light control unit facing the image display unit. The light control unit includes first and second substrates facing each other, a 2-viewpoint electrode layer and a multi-viewpoint electrode layer located between the first and second substrates, and a liquid crystal layer located between the first and second substrates.

18 Claims, 15 Drawing Sheets

OTHER PUBLICATIONS

Korean Patent Abstracts for Publication No. 1020030022582, dated Mar. 17, 2003, corresponding to Korean Registration KR 10-0477638 listed above.

Chinese Patent Gazette, dated Jun. 9, 2010, for corresponding Chinese Patent application 200610121474.7, noting listed reference in this IDS, as well as U.S. Patent 6,124,920, previously filed in an IDS dated Mar. 20, 2009.

English abstract of Chinese Publication 1402941, published Mar. 12, 2003, corresponding to CN 1197389 listed above.

* cited by examiner

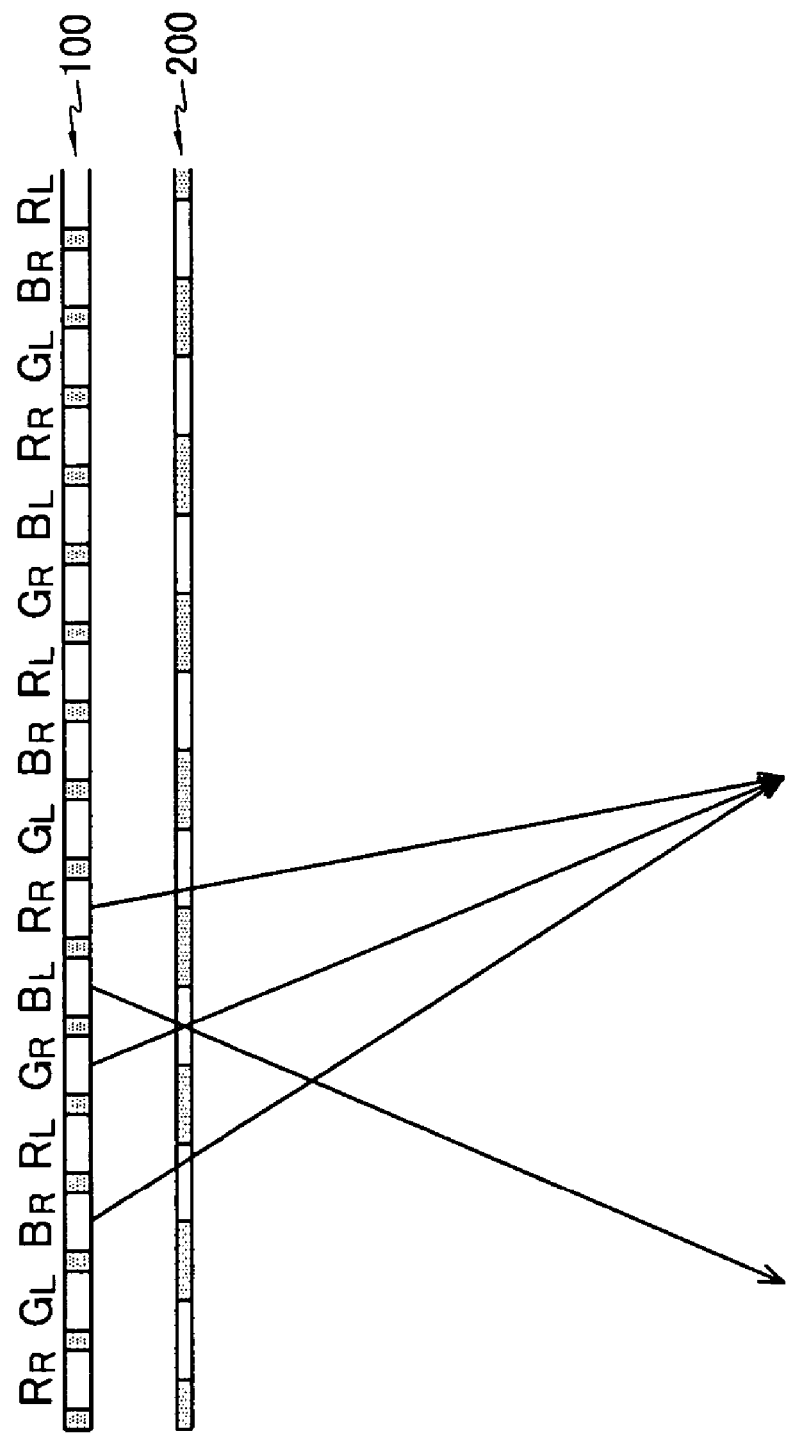

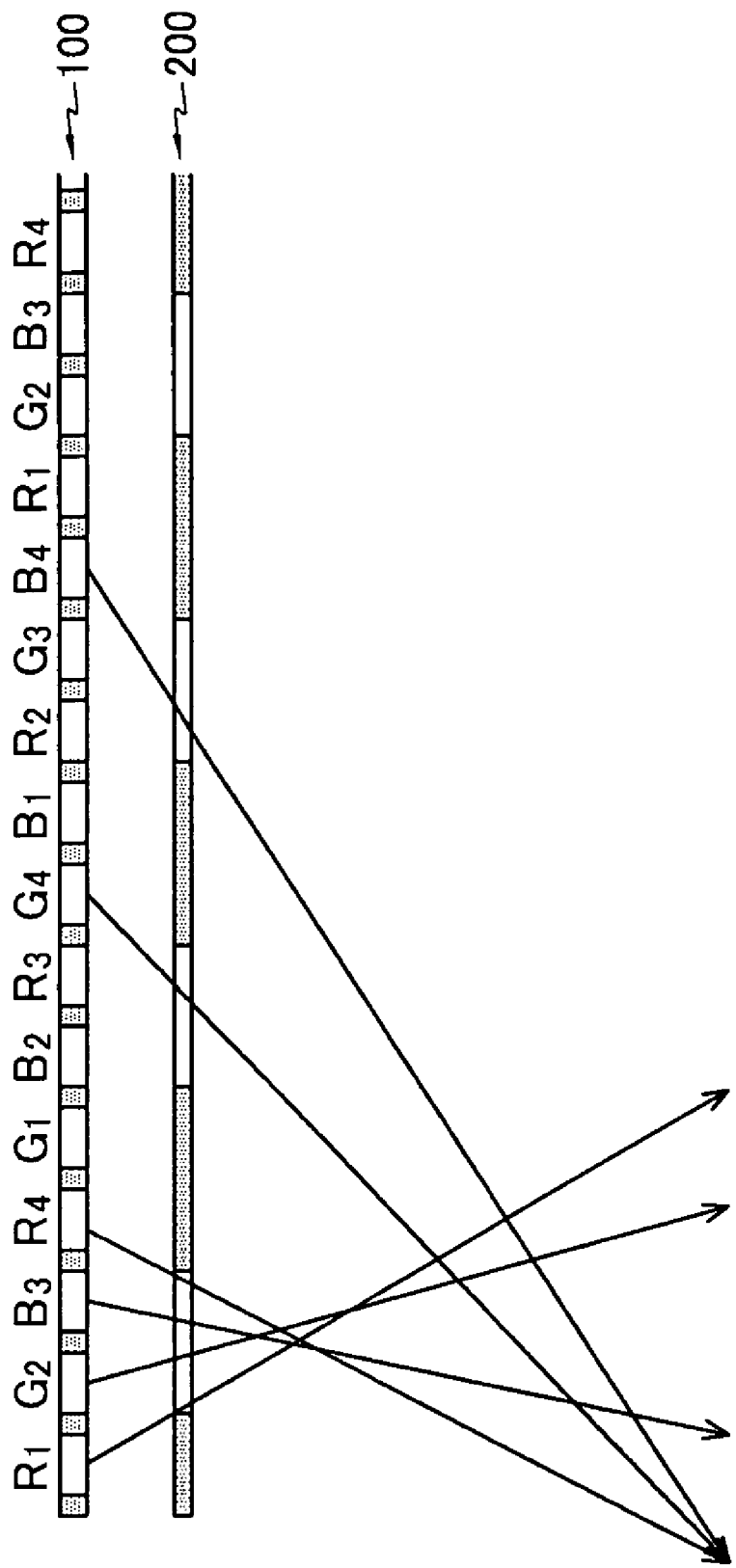

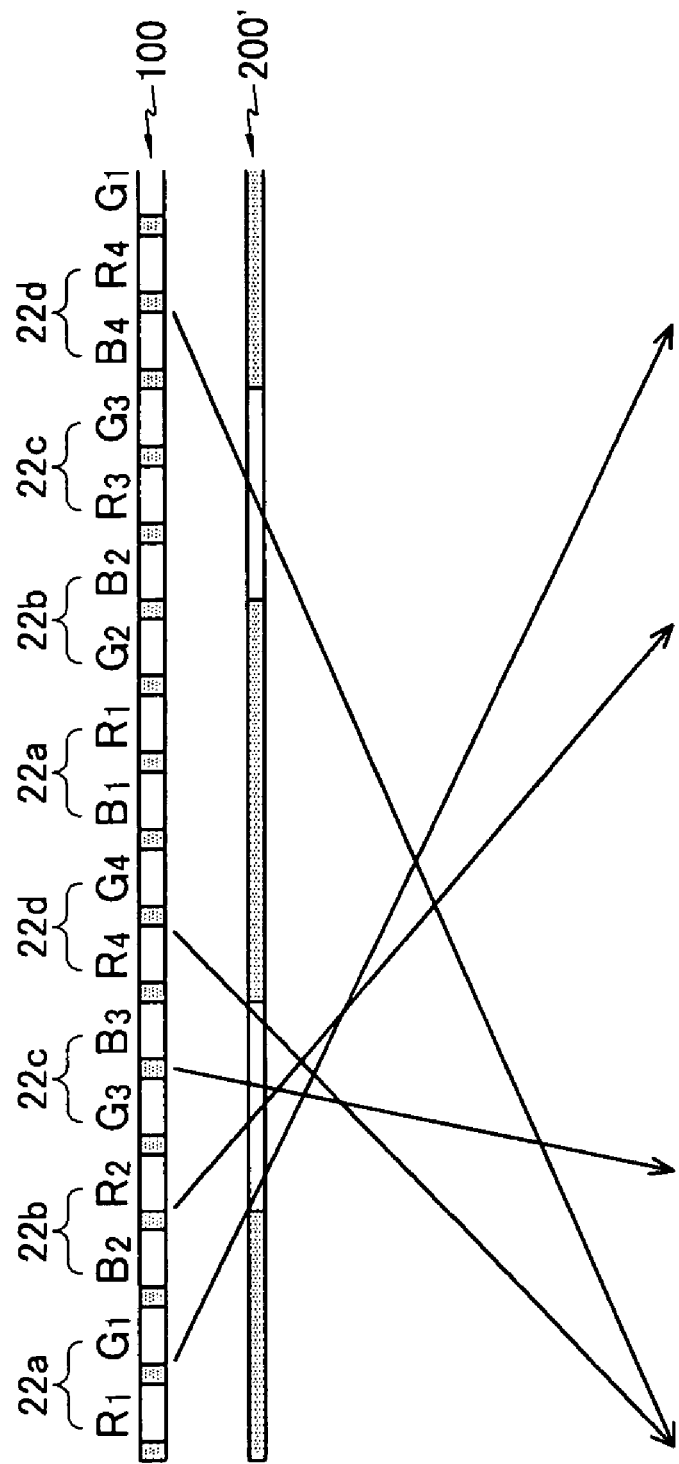

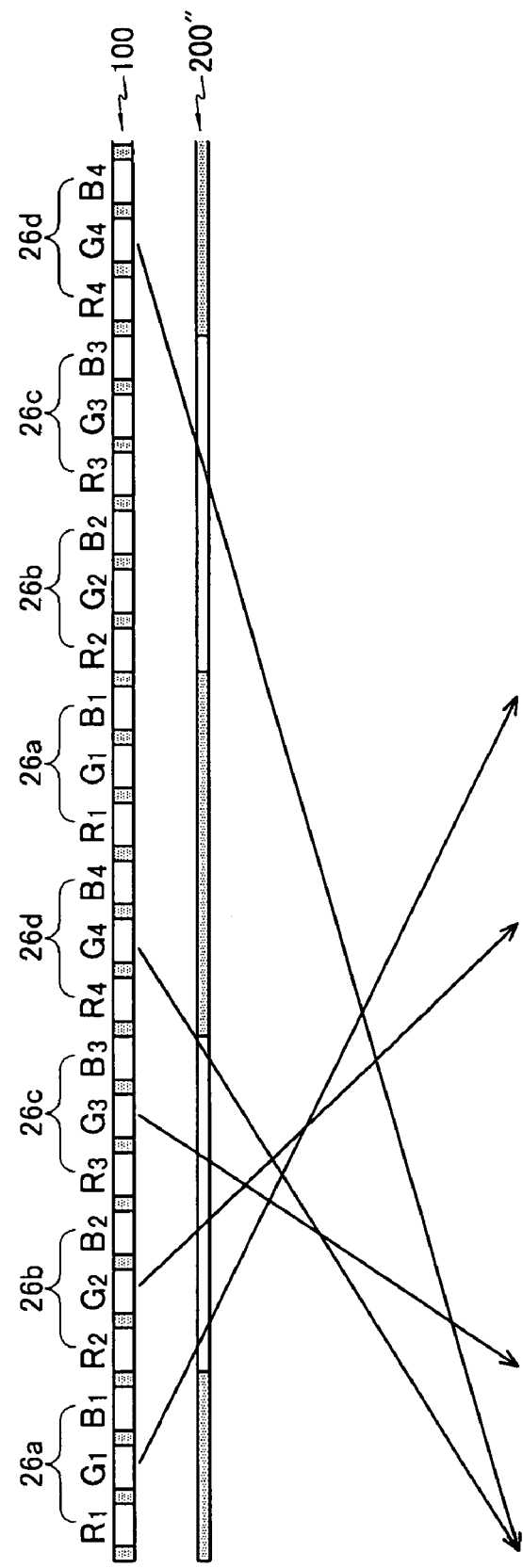

THREE-DIMENSIONAL DISPLAY DEVICE AND DRIVING METHOD THEREOF

CROSS-REFERENCE TO RELATED APPLICATION

This application claims priority to and the benefit of Korean Patent Application No. 10-2005-0078227 filed in the Korean Intellectual Property Office on Aug. 25, 2005, the entire content of which is incorporated herein by reference.

BACKGROUND OF THE INVENTION (a) Field of the Invention

The present invention relates to a three-dimensional display device, and in particular, to an autostereoscopic three-dimensional display device using a parallax barrier and a driving method thereof.

(b) Description of the Related Art

Generally, three-dimensional display devices supply different views to the left and right eyes of a user such that the user can have a depth perception and a stereoscopic perception of the viewed image.

The three-dimensional display device may be categorized as a stereoscopic display device where the user should wear viewing aids such as polarizing glasses, or an autostereoscopic display device where the user can see the desired three-dimensional image without wearing such viewing aids.

A common autostereoscopic display device utilizes an optical separation element, such as a lenticular lens, a parallax barrier, or a microlens array, to spatially separate or isolate the left-eye image part and the right-eye image part displayed at an image display unit in the directions of the left and right eyes of the user, respectively.

In particular, the parallax barrier may be formed with a liquid crystal shutter utilizing a transmission type of liquid crystal display, and in this case, it may be converted between a two-dimensional mode and a three-dimensional mode. Thus the parallax barrier can be easily applied to laptop computers or cellular phones.

Generally, the parallax barrier includes stripe-shaped light interception portions and light transmission portions. The parallax barrier selectively separates left and right eye images displayed at the image display unit through the light transmission portions such that the left and right eye images are respectively provided to the left and right eyes of the user.

The light transmission portions are arranged such that each of the light transmission portions corresponds to at least two of the pixels.

The most conventional type of three-dimensional display device using the parallax barrier forms a three-dimensional image in such a way that the left and right images displayed at the image display unit are separated through the parallax barrier and form a three-dimensional image.

In this device, the image is separated into 2-viewpoint ("two-viewpoint") images. However, there is a problem with this 2-viewpoint type of three-dimensional display device in that the visible range is very small, and the screen should be viewed while the user maintains a certain position in order to perceive the three-dimensional image.

Therefore, researches on a type of three-dimensional display device that separates an image into three or more multi-viewpoint images have been proceeding in order to obtain more natural stereoscopic perception and to solve the small visible range problem. However, in the case of the multi-viewpoint type, there is a problem of lower resolution in comparison with the 2-viewpoint type.

Hence, a problem with the conventional three-dimensional display devices is that it is difficult to overcome the disadvantages of the multi-viewpoint mode and the 2-viewpoint mode in the same device.

SUMMARY OF THE INVENTION

It is an aspect of the present invention to provide a three-dimensional display device that can selectively display a three-dimensional image having a wide visible range or relatively high resolution, and a driving method thereof.

In exemplary embodiments according to the present invention, a three-dimensional display device and a driving method thereof with one or more of the following features, are provided.

A three-dimensional display device in one embodiment includes an image display unit and a light control unit facing the image display unit, wherein the light control unit includes a first substrate, and second substrate facing the first substrate, a 2-viewpoint electrode layer and a multi-viewpoint electrode layer located between the first and second substrates, and a liquid crystal layer located between the first and second substrates.

The 2-viewpoint electrode layer may include first electrodes and second electrodes alternately and repeatedly arranged with a first pitch, a first connection electrode electrically connecting the first electrodes to each other, and a second connection electrode electrically connecting the second electrodes to each other.

The multi-viewpoint electrode layer may include third electrodes and fourth electrodes alternately and repeatedly arranged with a second pitch, the second pitch being larger than the first pitch, a third connection electrode electrically connecting the third electrodes to each other, and a fourth connection electrode electrically connecting the fourth electrodes to each other.

The image display unit may include sub-pixels, two of the sub-pixels correspond to each of the first and second electrodes that are adjacent to each other, and at least three of the sub-pixels correspond to each of the third and fourth electrodes that are adjacent to each other.

The image display unit may include sub-pixel groups, each sub-pixel group including two sub-pixels, two of the sub-pixel groups correspond to each of the first and second electrodes that are adjacent to each other, and at least three of the sub-pixel groups correspond to each of the third and fourth electrodes that are adjacent to each other.

The image display unit may include pixels, each pixel including red, green, and blue sub-pixels, two of the pixels correspond to each of the first and second electrodes that are adjacent to each other, and at least three of the pixels correspond to each of the third and fourth electrodes that are adjacent to each other.

The first, second, third, and fourth electrodes may have stripe patterns.

The liquid crystal layer may be located between the 2-viewpoint electrode layer and the multi-viewpoint electrode layer.

The light control unit may further include a common electrode layer located on an inner surface of the first substrate, the 2-viewpoint electrode layer and the multi-viewpoint electrode layer are located on an inner surface of the second substrate, the liquid crystal layer may be located between the common electrode layer and the 2-viewpoint and multi-viewpoint electrode layers, and an Insulation layer may be located between the 2-viewpoint electrode layer and the multi-viewpoint electrode layer.

The 2-viewpoint electrode layer may include first electrodes and second electrodes alternately and repeatedly arranged with a first pitch, a first connection electrode electrically connecting the first electrodes to each other, and a second connection electrode electrically connecting the second electrodes to each other, and the multi-viewpoint electrode layer may include third electrodes and fourth electrodes alternately and repeatedly arranged with a second pitch, the second pitch being larger than the first pitch, a third connection electrode electrically connecting the third electrodes to each other, and a fourth connection electrode electrically connecting the fourth electrodes to each other.

The 2-viewpoint electrode layer may include electrodes corresponding to first transmission portions having a first pitch, the multi-viewpoint electrode layer may include electrodes corresponding to second transmission portions having a second pitch, the second pitch being larger than the first pitch, and the common electrode layer may be formed as a single-body electrode.

The 2-viewpoint electrode layer may include first rows on which the first and second electrodes are alternately and repeatedly arranged in a pattern, and second rows that are alternately and repeatedly arranged with the first rows, the first and second electrodes being formed on the second rows in a pattern that is opposite to the pattern of the first rows. The multi-viewpoint electrode layer may include third rows in which the third and fourth electrodes are alternately and repeatedly arranged in a pattern, and fourth rows that are alternately and repeatedly arranged with the third rows, third and fourth electrodes being formed on the fourth rows in a pattern that is opposite to the pattern of the third rows.

The 2-viewpoint electrode layer may include first rows on which the first electrodes and the second electrodes are alternately and repeatedly arranged in a pattern, and second rows that are alternately and repeatedly arranged with the first rows and are formed in a pattern which is offset from the pattern of the first rows. The multi-viewpoint electrode layer may include third rows on which the third electrodes and the fourth electrodes are alternately and repeatedly arranged in a pattern, and fourth rows that are alternately and repeatedly arranged with the third rows and are formed in a pattern that is offset from the pattern of the third rows.

A driving method of a three-dimensional display device in another embodiment includes applying a data voltage for separating left and right eye images to the 2-viewpoint electrode layer while a reference voltage is applied to the multi-viewpoint electrode layer in a first mode in which the three-dimensional display device displays a 2-viewpoint image, and applying a data voltage for separating multi-viewpoint images to the multi-viewpoint electrode layer while the reference voltage is applied to the 2-viewpoint electrode layer in a second mode in which the three-dimensional display device displays multi-viewpoint image.

The driving method of a three-dimensional display device may include applying the data voltage for separating the left and right eye images to a first electrode set or a second electrode set while a reference voltage is applied to third and fourth electrode sets in the first mode, and applying the data voltage for separating the multi-viewpoint images to the third electrode set or the fourth electrode set while a reference voltage is applied to the first and second electrode sets in the second mode.

A driving method of a three-dimensional display device in another embodiment includes applying a data voltage for separating left and right eye images to the 2-viewpoint electrode layer while a reference voltage is applied to the common electrode layer in a first mode in which the three-dimensional display device displays a 2-viewpoint image, and applying a data voltage for separating multi-viewpoint images to the multi-viewpoint electrode layer while the reference voltage is applied to the common electrode layer in a second mode in which the three-dimensional display device displays a multi-viewpoint image.

The driving method of a three-dimensional display device may include applying the data voltage for separating the left and right eye images to the first electrode set or the second electrode set while the reference voltage is applied to the common electrode layer in the first mode, and applying the data voltage for separating the multi-viewpoint images to the third electrode set or the fourth electrode set while the reference voltage is applied to the common electrode layer in the second mode.

The 2-viewpoint electrode layer of the three-dimensional display device may include electrodes corresponding to first transmission portions having a first pitch, and the multi-viewpoint electrode layer of the three-dimensional display device may include electrodes corresponding to second transmission portions having a second pitch, the second pitch being larger than the first pitch.

BRIEF DESCRIPTION OF THE DRAWINGS

FIG. 4A is a schematic view showing an operation of the three-dimensional display device according to the first exemplary embodiment of the present invention in a first mode.

FIG. 4B is a schematic view showing an operation of the three-dimensional display device according to the first exemplary embodiment of the present invention in a second mode.

FIG. 5B a schematic view showing an operation of the three-dimensional display device according to the second exemplary embodiment of the present invention in a second mode.

FIG. 6B is a schematic view showing an operation of the three-dimensional display device according to the third exemplary embodiment of the present invention in a second mode.

DETAILED DESCRIPTION

The present invention will be described more fully hereinafter with reference to the accompanying drawings, in which certain exemplary embodiments of the present invention are shown.

Figure 1:
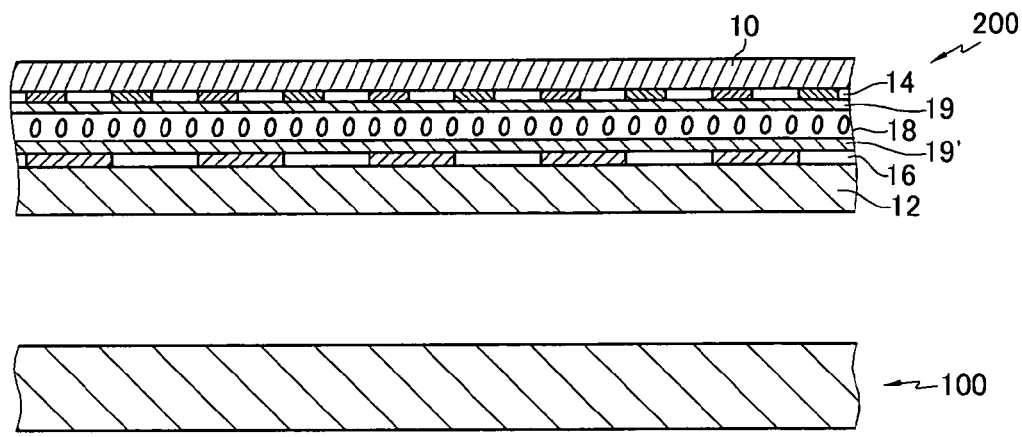
FIG. 1 is a schematic partial sectional view of a three-dimensional display device according to a first exemplary embodiment of the present invention.

FIG. 1 is a schematic partial sectional view of a three-dimensional display device according to a first exemplary embodiment of the present invention.

As shown in FIG. 1, the three-dimensional display device includes an image display unit 100, and a light control unit 200 placed in front of the image display unit 100.

Any suitable display device may be used as the image display unit 100. For instance, the image display unit 100 may be formed with a cathode ray tube, a liquid crystal display, a plasma display panel, a field emission display device, an organic electroluminescence display device, or any other suitable display device.

In the first exemplary embodiment of the invention, the light control unit 200 is formed with a liquid crystal shutter utilizing a normally white mode transmission type of liquid crystal display.

The light control unit 200 includes first and second substrates 10 and 12 facing each other. The first and second substrates 10 and 12 may be formed of glass having a shape of a rectangle.

A 2-viewpoint electrode layer 14 for separating the image into left and right eye images is formed on an inner surface of the first substrate 10, and a multi-viewpoint electrode layer 16 for separating the image into three or more multi-viewpoint images is formed on an inner surface of the second substrate 12.

A liquid crystal layer 18 is disposed between the 2-viewpoint electrode layer 14 and the multi-viewpoint electrode layer 16, and the liquid crystal layer 18 is driven with a driving voltage that is applied to the 2-viewpoint electrode layer 14 or the multi-viewpoint electrode layer 16.

A pair of alignment layers 19 and 19' respectively covering the 2-viewpoint electrode layer 14 and the multi-viewpoint electrode layer 16 may be formed.

In this case, the 2-viewpoint electrode layer 14 and the multi-viewpoint electrode layer 16 may be formed with a transparent material such as indium tin oxide (ITO). The structure of the electrode layers 14 and 16 will be described more fully later.

Figure 2A:
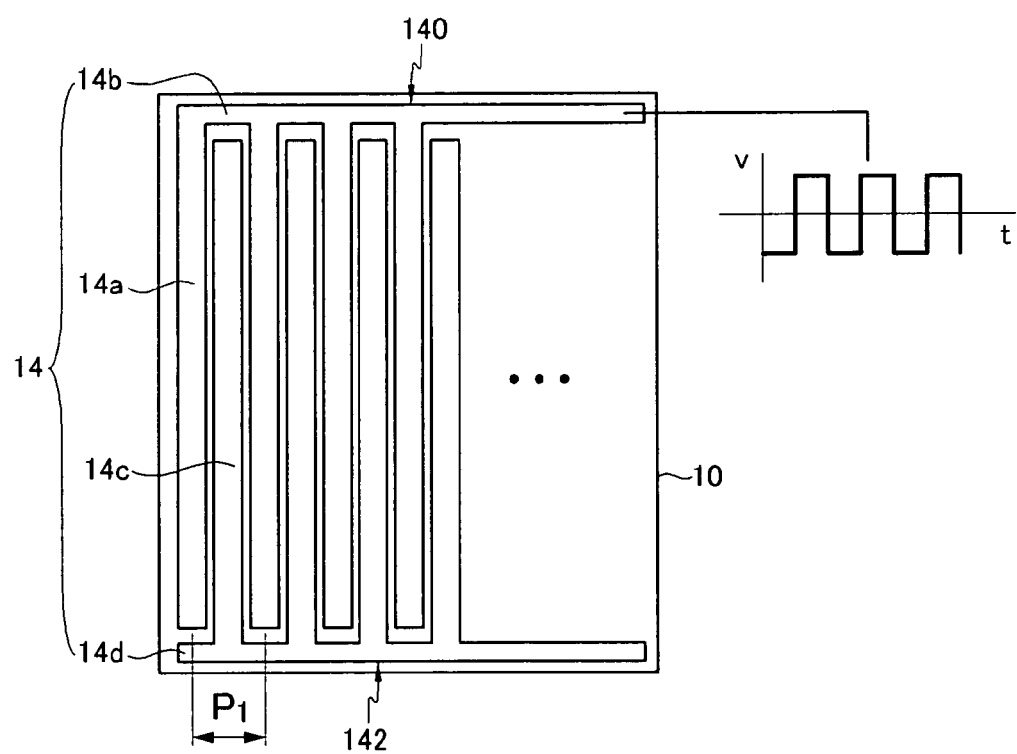
FIG. 2A is a plan view of a 2-viewpoint electrode layer of the three-dimensional display device according to the first exemplary embodiment of the present invention.
Figure 2B:
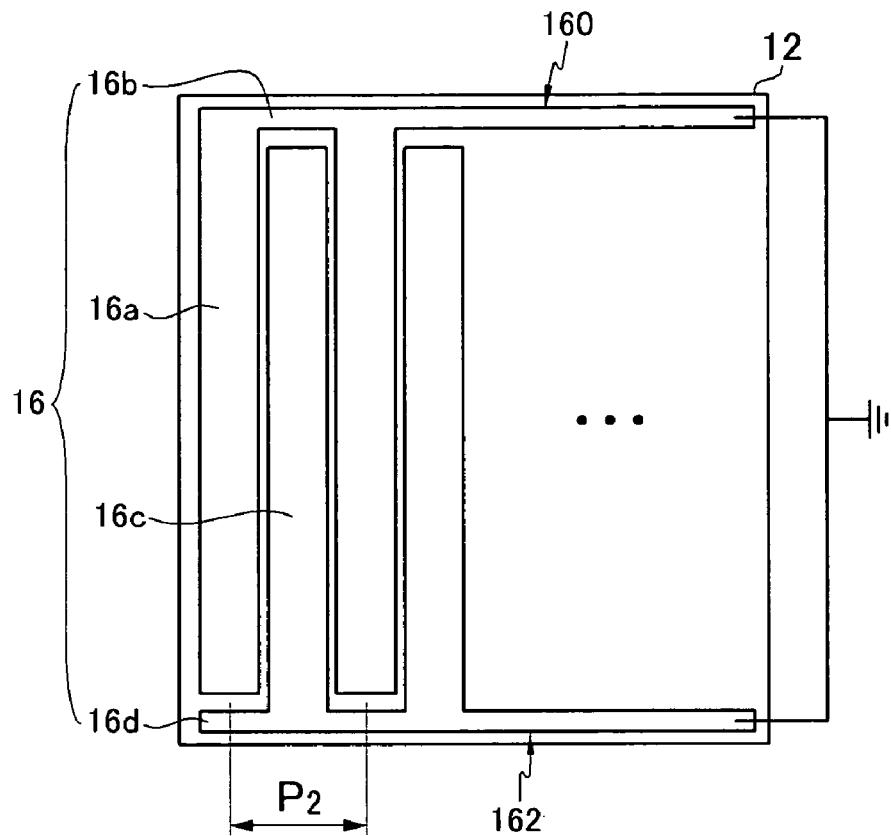
FIG. 2B is a plan view of a multi-viewpoint electrode layer of the three-dimensional display device according to the first exemplary embodiment of the present invention.

FIG. 2A shows the first substrate 10 on which the 2-viewpoint electrode layer 14 is formed, and FIG. 2B shows the second substrate 12 on which the multi-viewpoint electrode layer 16 is formed.

As shown in FIG. 2A, the 2-viewpoint electrode layer 14 is formed on the first substrate 10, and it includes first electrodes 14a arranged along a first direction of the first substrate 10 in a stripe pattern with predetermined intervals therebetween. The first electrodes 14a are connected to a first connection electrode 14b which is arranged on a side of the first substrate 10 (the upper side in the drawing), and the first electrodes 14a constitutes a first electrode set 140 together with the first connection electrode 14b.

A second electrode set 142 is also formed on the first substrate 10 in the same way. The second electrode set 142 includes second electrodes 14c arranged between the first electrodes 14a along the first direction of the first substrate 10, and a second connection electrode 14d connected to the second electrodes 14c and arranged on another side of the first substrate 10 opposite the first connection electrode 14b (the lower side in the drawing).

The first and second electrode sets 140 and 142 are formed on the first substrate 10 and cover substantially all the areas of the first substrate 10 corresponding to an active area of the image display unit 100.

As shown in FIG. 2B, the multi-viewpoint electrode layer 16 is formed on the second substrate 12 in the form of a third electrode set 160 and a fourth electrode set 162 in substantially the same way as the first and second electrode sets 140 and 142.

The third and fourth electrode sets 160 and 162 respectively include third electrodes 16a and fourth electrodes 16c arranged along a first direction of the second substrate 12, and a third connection electrode 16b and a fourth connection electrode 16d are connected to the third and fourth electrodes 16a and 16c, respectively.

In this case, a second pitch $P_2$ of the third and fourth electrodes 16a and 16c is larger than a first pitch $P_1$ of the first and second electrodes 14a and 14c.

The third and fourth electrode sets 160 and 162 are formed on the second substrate 12 while substantially covering all the areas of the second substrate 12 corresponding to the active area of the image display unit 100.

With the above structure, the three-dimensional display device is operated in a first mode showing a 2-viewpoint image or a second mode showing a multi-viewpoint image, according to a viewpoint selection signal selectively applied by the user.

Figure 3:
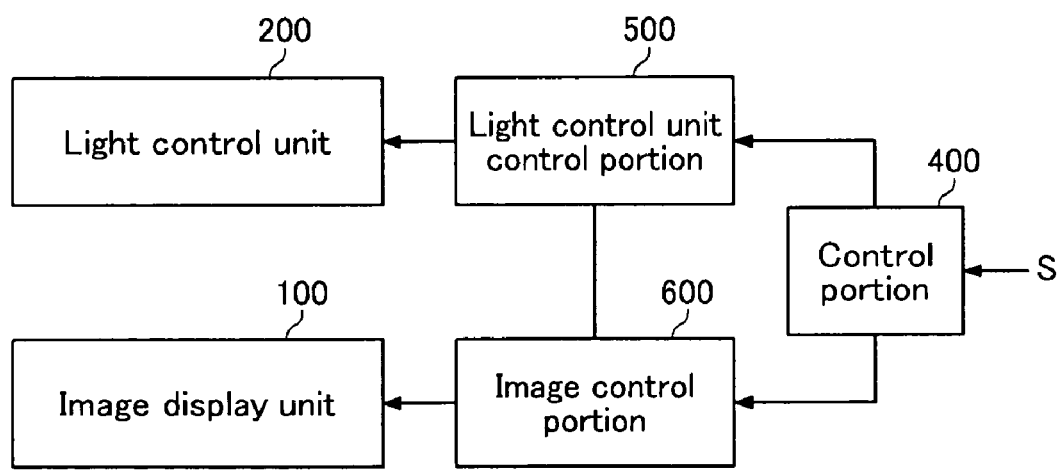
FIG. 3 is a schematic block diagram showing the operation of the three-dimensional display device according to the first exemplary embodiment of the present invention.

FIG. 3 is a schematic block diagram that shows an operation of the three-dimensional display device according to the first exemplary embodiment of the present invention.

Referring to FIG. 3, when the user selects the first mode, a viewpoint selection signal S is inputted to a control portion 400, and the control portion 400 applies a 2-viewpoint selection signal to a light control unit control portion 500.

The light control unit control portion 500 applies the 2-viewpoint selection signal to the light control unit 200, and the light control unit 200 is accordingly operated in a 2-viewpoint mode.

In this case, if the control portion 400 applies the 2-viewpoint selection signal to an image control portion 600, 2-viewpoint image data are stored in data storage memories of the image control portion 600. Accordingly, the image display unit 100 displays a 2-viewpoint image.

With the above operation of the light control unit 200 and the image display unit 100, the three-dimensional display device displays a 2-viewpoint three-dimensional image in the first mode.

When the user selects the second mode for a multi-viewpoint image, the viewpoint selection signal S is inputted to the control portion 400, and the control portion 400 applies a multi-viewpoint selection signal to the light control unit control portion 500. The light control unit control portion 500 applies the multi-viewpoint selection signal to the light control unit 200. Accordingly, the light control unit 200 is operated in a multi-viewpoint mode.

In this case, when the control portion 400 applies the multi-viewpoint image selection signal to the image control portion 600, multi-viewpoint image data are stored in the data storage memories of the image control portion 600, and accordingly the image display unit 100 displays a multi-viewpoint image.

With the above operation of the light control unit 200 and the image display unit 100, the three-dimensional display device displays a multi-viewpoint three-dimensional image in the second mode.

The operation of the three-dimensional display device will be described more fully hereinafter.

Referring back to FIGS. 2A and 2B, the operation of the three-dimensional display device in the first mode will be described. If the user selects the first mode, a reference voltage is applied to the third and fourth electrode set 160 and 162. The reference voltage is applied to the third and fourth electrodes 16a and 16c through the third and fourth connection electrodes 16b and 16d, respectively.

Concurrently to the application of the reference voltage, the data voltage is applied to the first electrode set 140 or the second electrode set 142 such that the image displayed at the image display unit 100 is provided to the user while being separated into the respective images for the left and right eyes of the user.

FIG. 2A shows that the data voltage having a predetermined voltage value is applied to the first electrode set 140.

When the reference voltage is applied to the third and fourth electrode sets 160 and 162 and the data voltage is applied to the first electrode set 140, liquid crystal molecules in the liquid crystal layer 18 corresponding to the first electrodes 14a are tilted due to the data voltage.

FIG. 4A and FIG. 4B are schematic views of the three-dimensional display device according to the first exemplary embodiment of the present invention, respectively showing the operation of the three-dimensional display device in the first mode for a 2-viewpoint image and the second mode for a multi-viewpoint image.

As shown in FIG. 4A, sub-pixels of the image display unit 100 can be divided into sub-pixels for the left eye $R_L$, $G_L$, and $B_L$ and sub-pixels for the right eye $R_R$, $G_R$, and $B_R$ by providing image signals for the left and right eyes respectively to the left eye and right eye sub-pixels.

Accordingly, the images from the sub-pixels for the left eye $R_L$, $G_L$, and $B_L$ and the sub-pixels for the right eye $R_R$, $G_R$, and $B_R$ of the image display unit 100 are intercepted (or blocked) at the portions where the liquid crystal molecules are tilted (the portions corresponding to the first electrode lines), and are transmitted at the portions where the liquid crystal molecules are not tilted (the portions corresponding to the second electrode lines).

That is, as shown in FIG. 4A, the light emitted from each of the sub-pixels for the left eye $R_L$, $G_L$, and $B_L$ and the sub-pixels for the right eye $R_R$, $G_R$, and $B_R$ of the image display unit 100 is respectively provided to the left and right eyes of the user by an operation of a light control unit 200', which is similar to the operation of the light control unit 200 described above in reference to the first embodiment. Thus the user can have a stereoscopic perception. The light control unit 200' has a structure that is substantially the same as the structure of the light control unit 200 of FIGS. 1, 2A and 2B, except that the pitch of the first and second electrodes may be different from P1, and the pitch of the third and fourth electrodes may be different from P2.

In this case where the data voltage is applied to the second electrode set 142 of the 2-viewpoint electrode layer 14, the liquid crystal molecules corresponding to the second electrodes 14c of the second electrode set 142 are tilted. That is, the location of the tilted liquid crystal molecules is changed. Accordingly, the locations of the light interception portions and the light transmission portions of the light control unit 200 are changed.

The operation of the three-dimensional display device according to the first exemplary embodiment of the present invention in the second mode will be described hereinafter.

The first embodiment of the present invention illustrates an image that is separated into a 2-viewpoint image as an example, but this is merely to exemplify the present invention. The present invention can be adapted to a three-dimensional display device that separates the image into images for multi-viewpoints in which the image is separated into three or more images for three or more viewpoints.

When the user selects the second mode, the reference voltage and the data voltage are applied opposite to the case of the first mode described above.

That is, in the second mode, the reference voltage is applied to the first and second electrode sets 140 and 142 of the 2-viewpoint electrode layer 14, and the data voltage is applied to the third electrode set 160 or the fourth electrode set 162 of the multi-viewpoint electrode layer 16.

Accordingly, in the second mode, liquid crystal molecules corresponding to the third electrodes 16a or the fourth electrodes 16c are tilted, and the light interception portions and the light transmission portions of the light control unit 200 are set by tilting of the liquid crystal molecules.

As shown in FIG. 4B, to display first to fourth images, signals are alternately and repeatedly provided to the sub-pixels of the image display unit 100, and the sub-pixels are divided into first sub-pixels $R_1$, $G_1$, and $B_1$ for displaying the first image, second sub-pixels $R_2$, $G_2$, and $B_2$ for displaying the second image, third sub-pixels $R_3$, $G_3$, and $B_3$ for displaying the third image, and fourth sub-pixels $R_4$, $G_4$, and $B_4$ for displaying the fourth image.

Accordingly, the images from the first sub-pixels $R_1$, $G_1$, and $B_1$, the second sub-pixels $R_2$, $G_2$, and $B_2$, the third sub-pixels $R_3$, $G_3$, and $B_3$, and the fourth sub-pixels $R_4$, $G_4$, and $B_4$ of the image display unit 100 are intercepted at the portions where the liquid crystal molecules are tilted, and are transmitted at the portions where the liquid crystal molecules are not tilted. Thus four different images are provided to the user, and the user can have a stereoscopic perception.

In this case, two of the sub-pixels are arranged to correspond to each pair of the first electrode 14a and the second electrode 14c that are adjacent to each other, and four of the sub-pixels are arranged to correspond to each pair of the third electrode 16a and the fourth electrode 16c that are adjacent to each other.

According to the structure of the electrodes formed on the first and second substrates 10 and 12 and the voltages applied to the electrodes, the light control unit 200 of the described embodiment provides the user with a three-dimensional image of the 2-viewpoint mode or multi-viewpoint mode, selectively.

In particular, the three-dimensional display device can be applied to a display device that can be viewed by two or more persons at the same time, such as monitors, televisions, displays for a vehicle, etc.

Figure 5A:
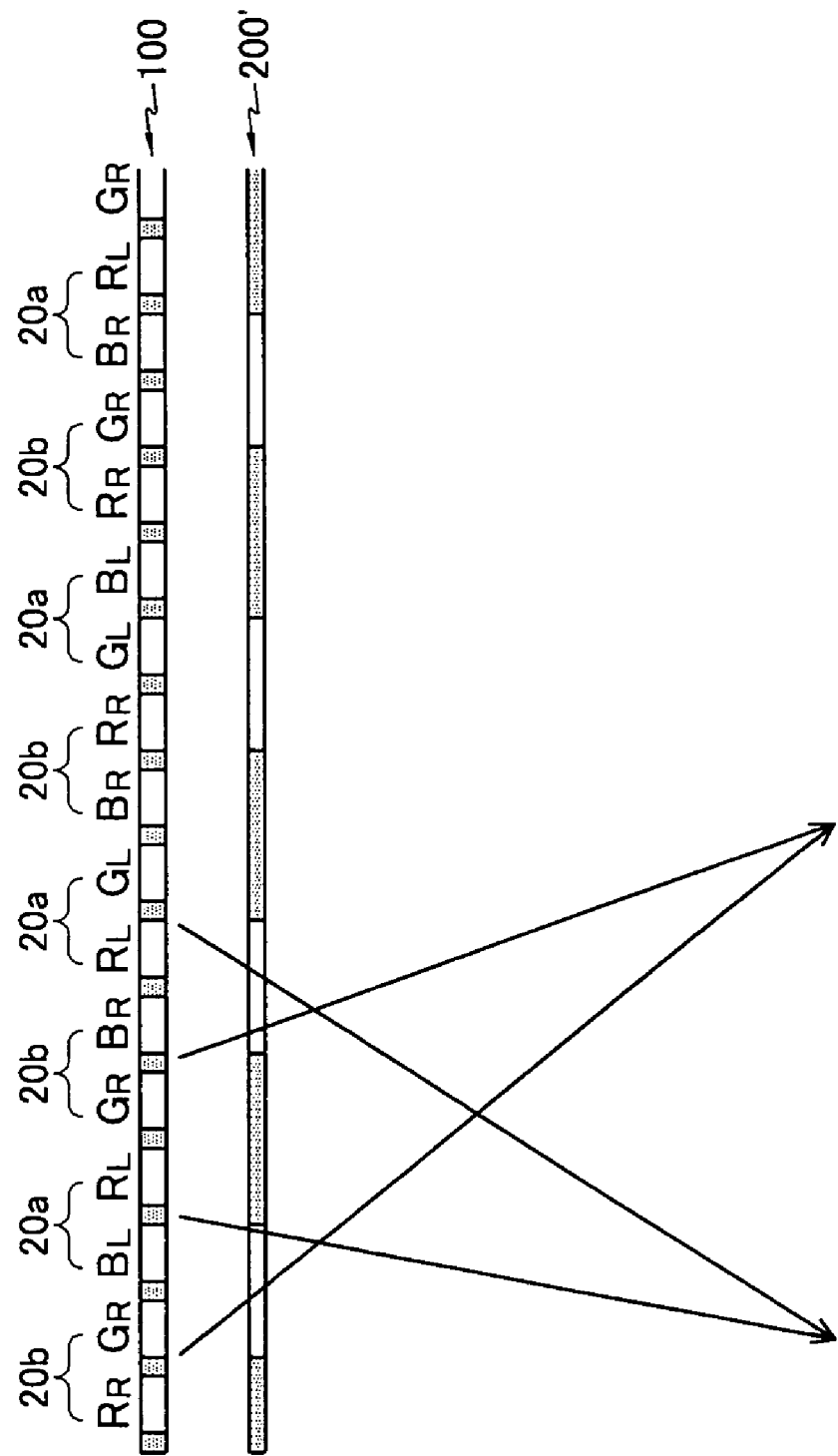
FIG. 5A is a schematic view showing an operation of a three-dimensional display device according to a second exemplary embodiment of the present invention in a first mode.

FIG. 5A and FIG. 5B respectively show an operation of the three-dimensional display device according to a second embodiment of the present invention in first and second modes. The second embodiment of the present invention will be described with reference to FIGS. 5A and 5B hereinafter.

In the first mode, since the image signals for the left and right eyes are provided to the sub-pixel groups which consist of two sub-pixels of the image display unit 100 in turn, the sub-pixel groups are divided into left eye sub-pixel groups 20a and right eye sub-pixel groups 20b.

In this case, the 2-viewpoint electrode layer and the multi-viewpoint electrode layer are operated using substantially the same method as in the first mode of the first embodiment described above.

Therefore, the images from the left eye sub-pixel groups 20a and the right eye sub-pixel groups 20b are intercepted at the portions in which the liquid crystal molecules are tilted, and are transmitted at the portions in which the liquid crystal molecules are not tilted. Accordingly, the three-dimensional image separated into the image for the left and right eyes is provided to the user.

As shown in FIG. 5B, first to fourth image signals are alternately and repeatedly provided to the sub-pixel groups of the image display unit 100, and the sub-pixel groups are divided into first sub-pixel groups 22a, second sub-pixel groups 22b, third sub-pixel groups 22c, and fourth sub-pixel groups 22d.

In this case, the 2-viewpoint electrode layer and multi-viewpoint electrode layer are operated using substantially the same method as the second mode of the first embodiment described above.

Accordingly, the images from the first sub-pixel groups 22a, the second sub-pixel groups 22b, the third sub-pixel groups 22c, and the fourth sub-pixel groups 22d of the image display unit 100 are intercepted at the portion where the liquid crystal molecules are tilted, and are transmitted at the portion where the liquid crystal molecules are not tilted. Thus 4 different images are provided to the user, and the user can have a stereoscopic perception.

In this case, two of the sub-pixel groups are arranged to correspond to each of the light transmission portions formed by the operation of the liquid crystal layer in the first mode, and four of the sub-pixel groups are arranged to correspond to each of the light transmission portions formed by the operation of the liquid crystal layer in the second mode. This is because two of the sub-pixel groups correspond to each of the first and second electrodes that are adjacent to each other, and four of the sub-pixel groups correspond to each of the third and fourth electrodes that are adjacent to each other.

Figure 6A:
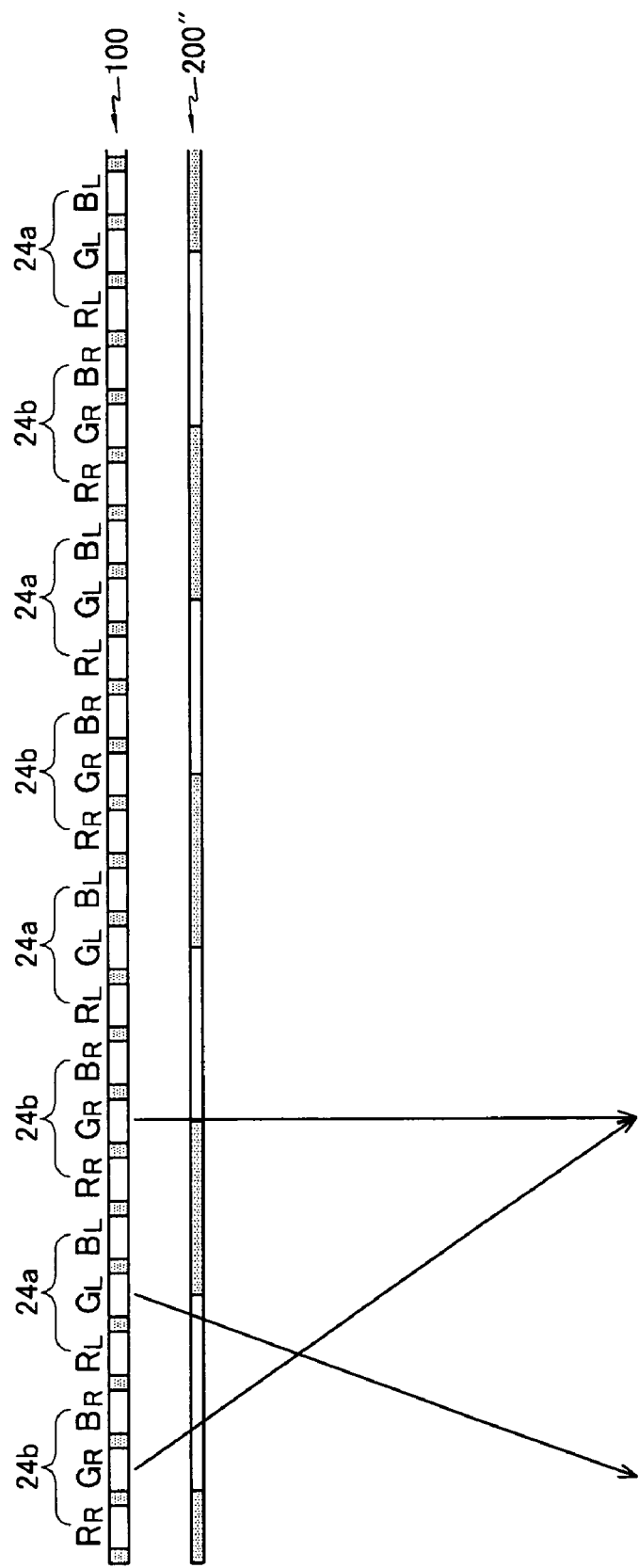
FIG. 6A is a schematic view showing an operation of a three-dimensional display device according to a third exemplary embodiment of the present invention in a first mode.

FIG. 6A and FIG. 6B show operations of a three-dimensional display device according to a third embodiment of the present invention in first and second modes. The third embodiment of the present invention will be described with reference to FIGS. 6A and 6B hereinafter. A light control unit 200" has a structure that is substantially the same as the structure of the light control unit 200 of FIGS. 1, 2A and 2B, except that the pitch of the first and second electrodes may be different from P1, and the pitch of the third and fourth electrodes may be different from P2.

In the first mode, since the image signals for the left and right eyes are provided to pixels which consist of 3 sub-pixels of the image display unit 100 in turn, the pixels are divided into the left eye pixels 24a and the right eye pixels 24b.

In this case, the 2-viewpoint electrode layer and multi-viewpoint electrode layer are driven using substantially the same method as in the first mode of the first embodiment described above.

Therefore, the images from the left eye pixels 24a and the right eye pixels 24b are intercepted at the portions in which the liquid crystal molecules are tilted, and are transmitted at the portions in which the liquid crystal molecules are not tilted. Accordingly, the three-dimensional image separated into the images for the left and right eyes is provided to the user.

Further, as shown in FIG. 6B, first to fourth image signals are alternately and repeatedly provided to the pixels of the image display unit 100, and the pixels are divided into first pixels 26a, second pixels 26b, third pixels 26c, and fourth pixels 26d.

In this case, the 2-viewpoint electrode layer and the multi-viewpoint electrode layer are driven using substantially the same method as the second mode of the first embodiment described above.

Accordingly, the images from the first pixels 26a, the second pixels 26b, the third pixels 26c, and the fourth pixels 26d of the image display unit 100 are intercepted at the portions where the liquid crystal molecules are tilted, and are transmitted at the portions where the liquid crystal molecules are not tilted. Thus four different images are provided to the user, and the user can have a stereoscopic perception.

In this case, two of the pixels are arranged to correspond to each of the light transmission portions formed by the driving of the liquid crystal layer in the first mode, and four of the pixels are arranged to correspond to each of the light transmission portions formed by the driving of the liquid crystal layer in the second mode. This is because two of the pixels correspond to each of the first and second electrodes that are adjacent to each other, and four of the pixels correspond to each of the third and fourth electrodes that are adjacent to each other.

Figure 7:
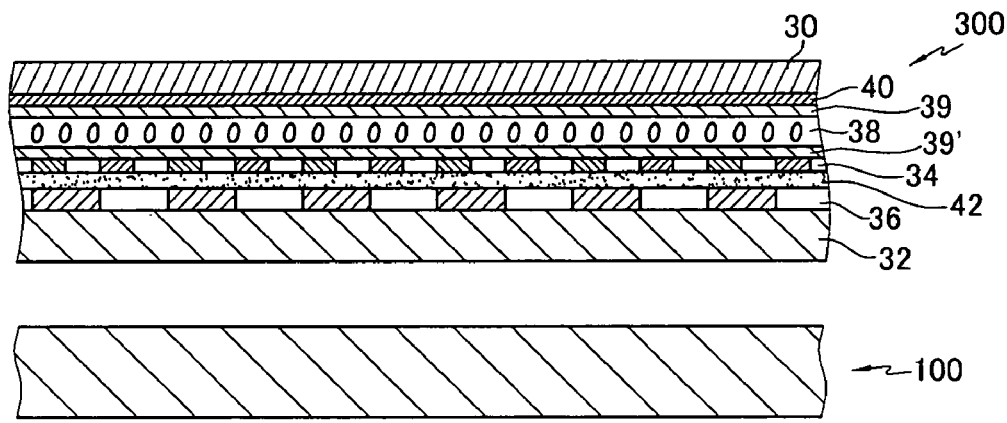
FIG. 7 is a schematic partial sectional view of a three-dimensional display device according to a fourth exemplary embodiment of the present invention.
Figure 8A:
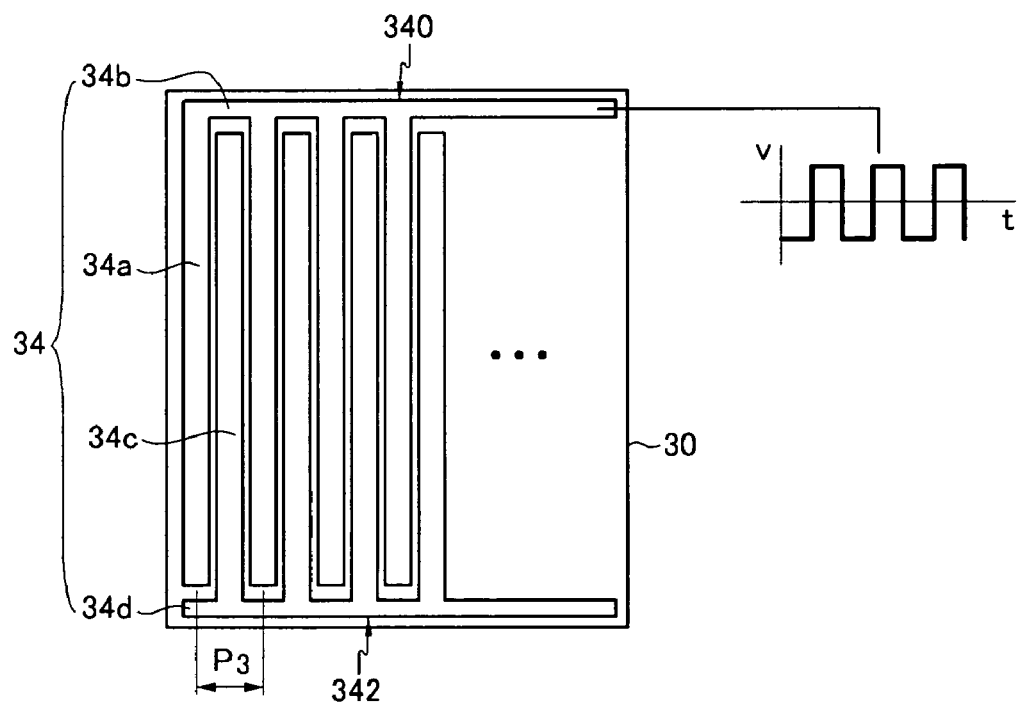
FIG. 8A is a plan view of a 2-viewpoint electrode layer of the three-dimensional display device according to the fourth exemplary embodiment of the present invention.
Figure 8B:
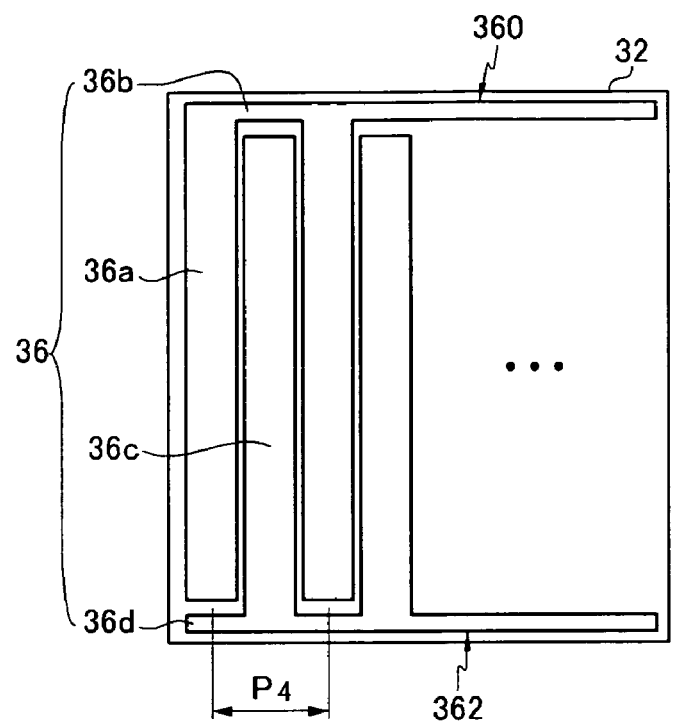
FIG. 8B is a plan view of a multi-viewpoint electrode layer of the three-dimensional display device according to the fourth exemplary embodiment of the present invention.
Figure 8C:
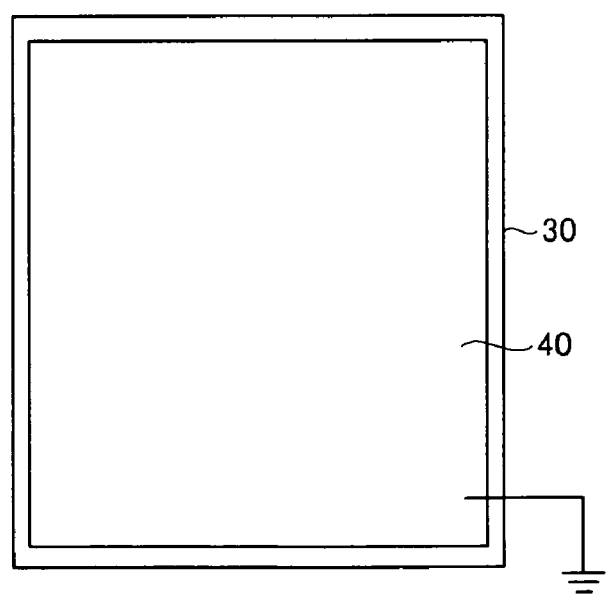
FIG. 8C is a plan view of a common electrode layer of the three-dimensional display device according to the fourth exemplary embodiment of the present invention.

FIG. 7 schematically shows a cross section of a three-dimensional display device according to a fourth embodiment of the present invention, and each of FIG. 8A, FIG. 8B and FIG. 8C shows a respective plan view of the electrode layers.

As shown in FIG. 7, the three-dimensional display device according to the fourth embodiment includes an image display unit 100 and a light control unit 300 placed in front of the image display unit 100.

The light control unit 300 includes first and second substrates 30 and 32 facing each other.

A common electrode layer 40 is formed on an inner surface of the first substrate 30 as a single-body type of electrode, and a multi-viewpoint electrode layer 36 for separating the image into three or more multi-viewpoint images is formed on an inner surface of the second substrate 32. An insulation layer 42 and a 2-viewpoint electrode layer 34 that separates an image into left and right view images are formed thereon.

A pair of alignment layers 39 and 39' respectively covering the common electrode layer 40 and the 2-viewpoint electrode layer 34 may be formed, and a liquid crystal layer 38 is disposed between the 2-viewpoint electrode layer 34 and the common electrode layer 40.

The structure of the electrode layers will be described more fully hereinafter.

As shown in FIGS. 8A and 8B, the 2-viewpoint electrode layer 34 and the multi-viewpoint electrode layer 36 that are formed on the inner surface of the second substrate 32 respectively have the same structures as those of the 2-viewpoint electrode layer and the multi-viewpoint electrode layer of the first embodiment of the present invention.

In this case, a second pitch $P_4$ formed by third and fourth electrodes 36a and 36c is larger than a first pitch $P_3$ formed by first and second electrodes 34a and 34c.

As shown in FIG. 8C, the common electrode layer 40 is formed on the first substrate 30 as a single-body electrode.

In the first mode, a reference voltage is applied to the common electrode layer 40, and a driving voltage is applied to the first electrode set 340 or the second electrode set 342 of the 2-viewpoint electrode layer 34.

FIG. 8A shows that the driving voltage is applied to the first electrode set 340 as an example. Accordingly, the liquid crystal molecules of the liquid crystal layer 38 are tilted, and the light interception portions and the light transmission portions are formed. The image from the image display unit is separated into the left and right eye images, and a three-dimensional image is thereby provided to the user.

In the second mode, the reference voltage is applied to the common electrode layer 40, and the driving voltage is applied to the third electrode set 360 or the fourth electrode set 362 of the multi-viewpoint electrode layer 36. Accordingly, the liquid crystal molecules of the liquid crystal layer 38 are tilted, and the light interception portions and the light transmission portions are formed. The image of the image display unit is thereby separated into multi-viewpoint images, and thus a three-dimensional image is provided to the user.

Figure 9A:
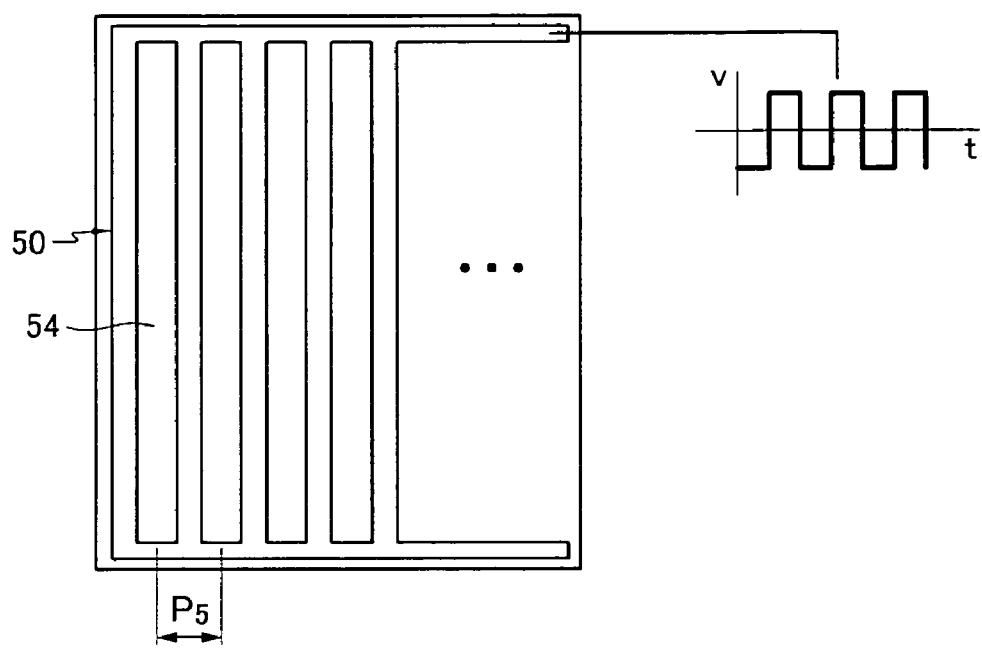
FIG. 9A is a plan view of a 2-viewpoint electrode layer of a three-dimensional display device according to a fifth exemplary embodiment of the present invention.
Figure 9B:
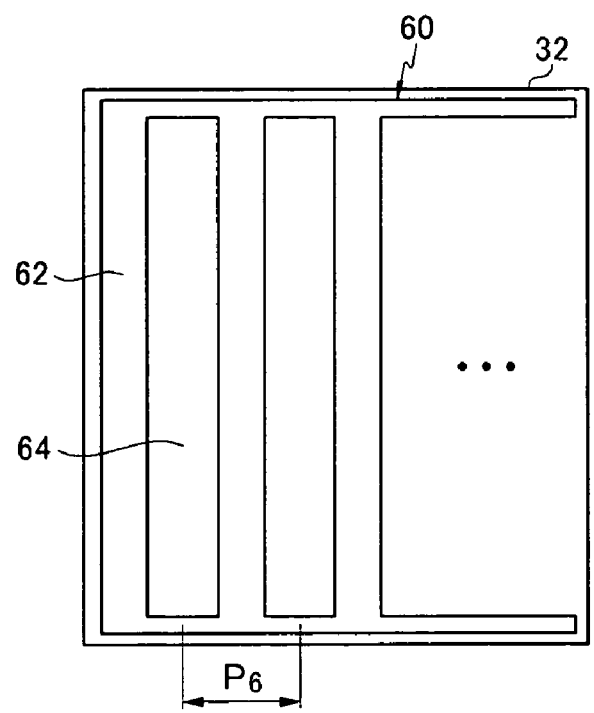
FIG. 9B is a plan view of a multi-viewpoint electrode layer of the three-dimensional display device according to the fifth exemplary embodiment of the present invention.
Figure 9C:
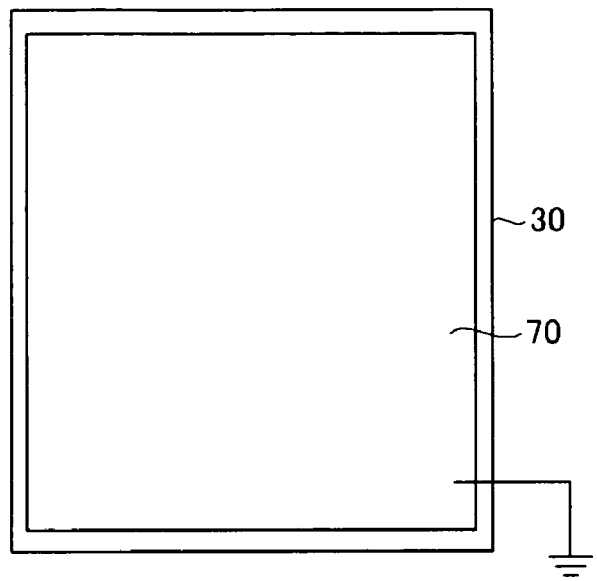
FIG. 9C a plan view of a common electrode layer of the three-dimensional display device according to the fifth exemplary embodiment of the present invention.

FIGS. 9A, 9B and 9C are plan views that respectively show a 2-viewpoint electrode layer 50, a multi-viewpoint electrode layer 60, and a common electrode layer 70 of a three-dimensional display device according to a fifth embodiment of the present invention. As shown in FIGS. 9A, 9B and 9C, the electrodes are formed as single-body type electrodes in the fifth embodiment of the present invention.

That is, the 2-viewpoint electrode layer 50 and the multi-viewpoint electrode layer 60 are formed in a structure such that first and second transmission portions 54 and 64 having a stripe pattern are respectively arranged on the electrode layers 50 and 60. A common electrode layer 70 which is formed as a single-body electrode is further provided.

In this case, a second pitch $P_6$ formed by the second transmission portions 64 of the multi-viewpoint electrode layer 60 is larger than a first pitch $P_5$ formed by the first transmission portions 54 of the 2-viewpoint electrode layer 50.

A reference voltage is applied to the common electrode layer 70 while a driving voltage is applied to the 2-viewpoint electrode layer 50 in the first mode and to the multi-viewpoint electrode layer 60 in the second mode. The liquid crystal molecules of the liquid crystal layer 38 are tilted, and the light interception portions and the light transmission portions are formed. Accordingly, a three-dimensional image is provided by transmitting the image from the image display unit 100 selectively.

Figure 10A:
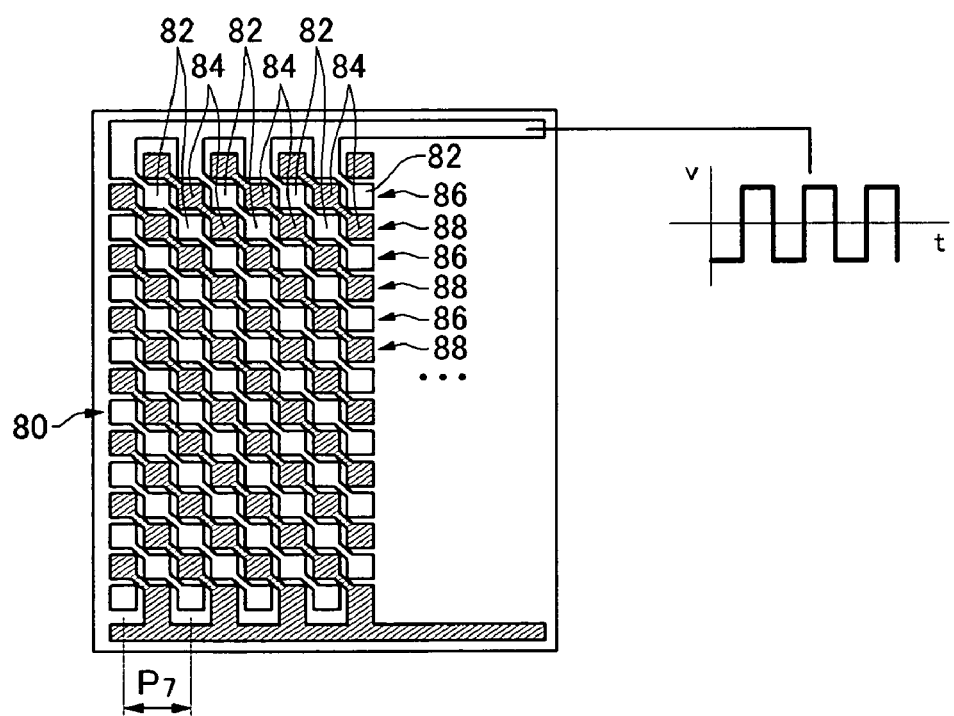
FIG. 10A is a plan view of a 2-viewpoint electrode layer of a three-dimensional display device according to a sixth exemplary embodiment of the present invention.
Figure 10B:
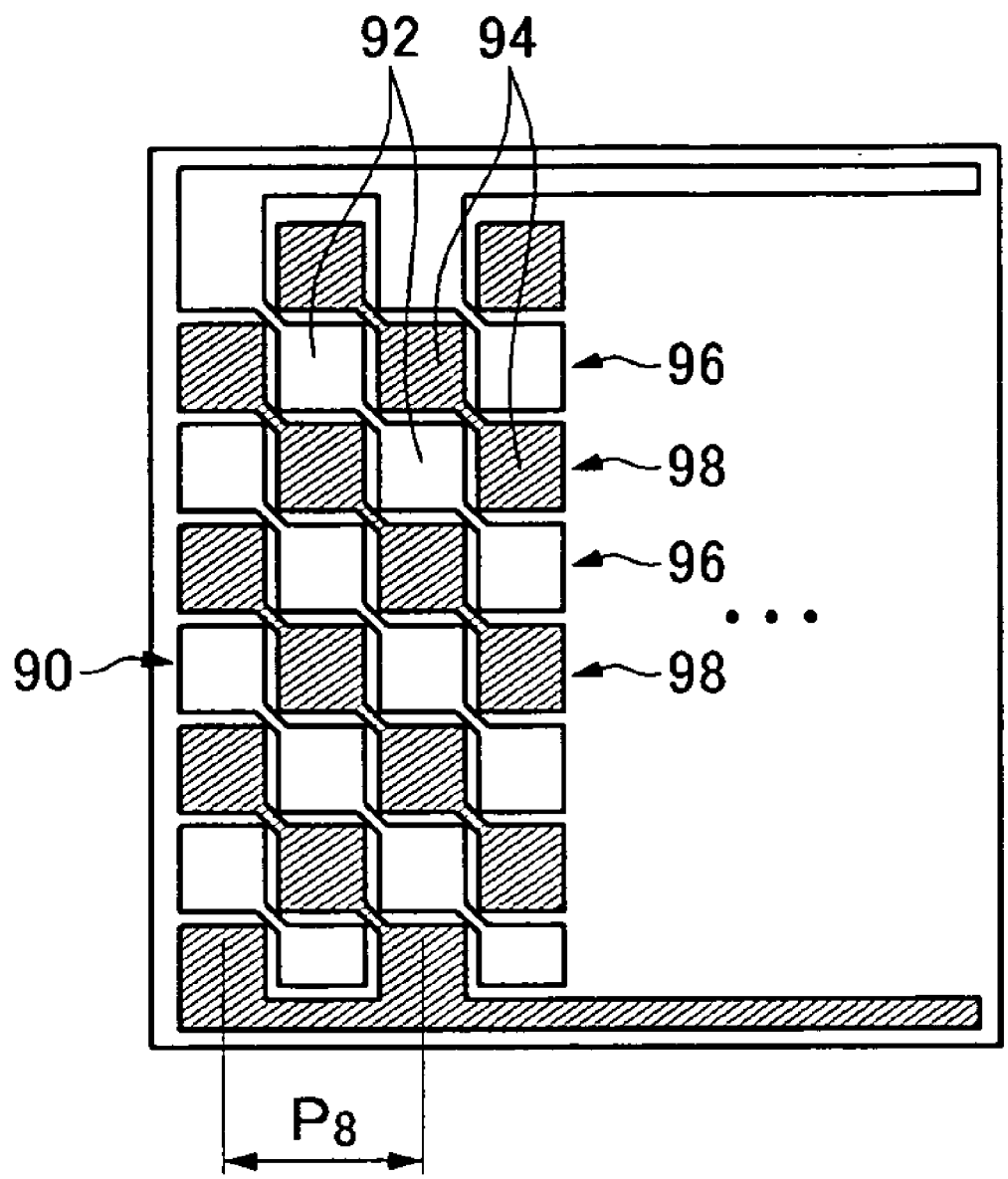
FIG. 10B is a plan view of a multi-viewpoint electrode layer of the three-dimensional display device according to the sixth exemplary embodiment of the present invention.

Each of FIGS. 10A and 10B are plan views of a 2-viewpoint electrode layer 80 and a multi-viewpoint electrode layer 90 of a three-dimensional display device according to a sixth embodiment of the present invention.

As shown in FIG. 10A, first electrodes 82 are arranged on the 2-viewpoint electrode layer 80 at regular intervals, and are electrically connected to each other. The second electrodes 84 are arranged between the first electrodes 82 while electrically connected to each other.

In this case, the 2-viewpoint electrode layer 80 includes first rows 86 and second rows 88 that are alternately and repeatedly arranged.

The first and second electrodes 82 and 84 are alternately and repeatedly arranged in the first rows 86 and have a first pitch $P_7$, and they are alternately and repeatedly arranged in the second rows 88 having a pattern which is opposite to the pattern of the first rows 86.

As shown in FIG. 10B, third electrodes 92 are arranged on the multi-viewpoint electrode layer 90 at regular intervals, and are electrically connected to each other. Fourth electrodes 94 are arranged between the third electrodes 92 while being electrically connected to each other.

In this case, the multi-viewpoint electrode layer 90 includes third rows 96 and fourth rows 98 that are alternately and repeatedly arranged.

The third and fourth electrodes 92 and 94 are alternately and repeatedly arranged in the third rows 96 and have a second pitch $P_8$, and they are alternately and repeatedly arranged in the fourth rows 98 having a pattern that is opposite to the pattern of the third rows 96.

A second pitch $P_8$ of the third electrodes 92 and the fourth electrodes 94 is larger than a first pitch $P_7$ of the first electrodes 82 and the second electrodes 84.

With the structure described above, a driving voltage is applied to the 2-viewpoint electrode layer 80 in the first mode, and to the multi-viewpoint electrode layer 90 in the second mode. Accordingly, the user can see a three-dimensional 2-viewpoint or multi-viewpoint image.

With the three-dimensional display device including the 2-viewpoint electrode layer 80 and the multi-viewpoint electrode layer 90 described above, vertical interference patterns according to the stripe pattern of the electrodes do not occur, and degradation of the resolution is not observed due to the balance of the horizontal resolution and vertical resolution of the three-dimensional image.

Figure 11A:
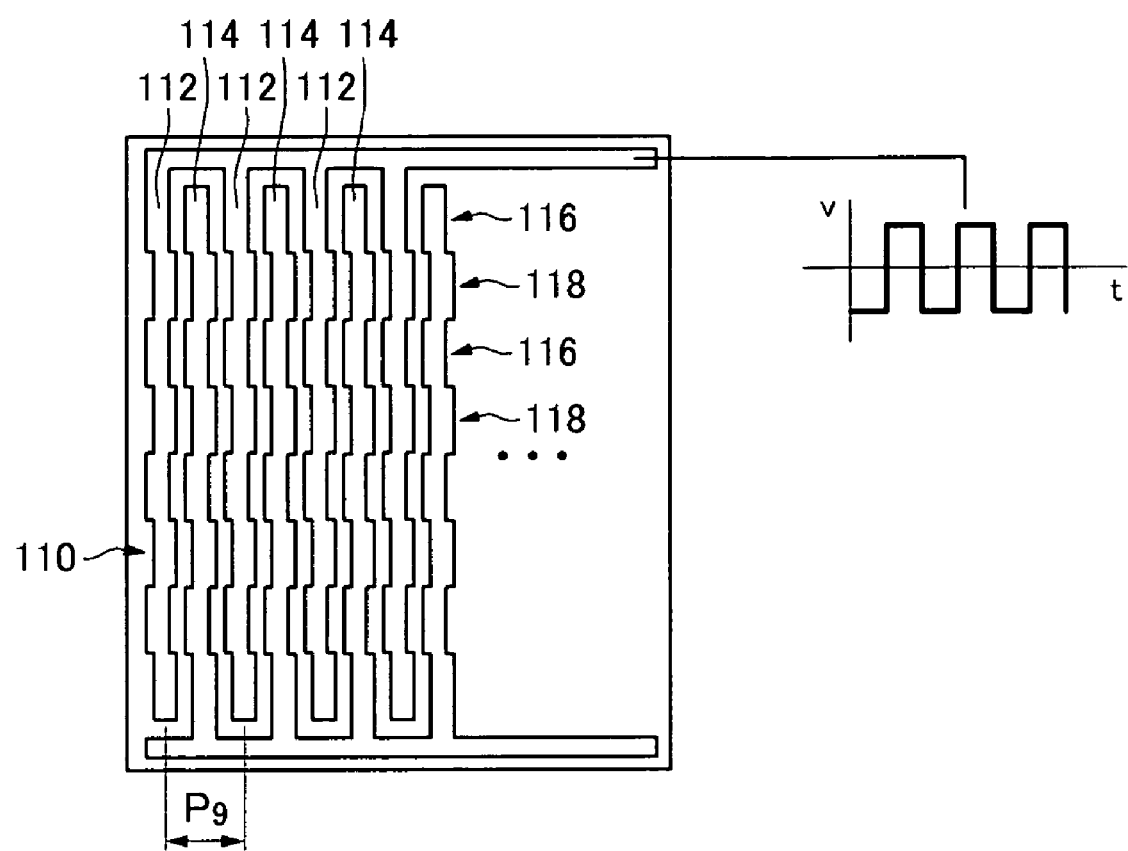
FIG. 11A is a plan view of a 2-viewpoint electrode layer of a three-dimensional display device according to a seventh exemplary embodiment of the present invention.
Figure 11B:
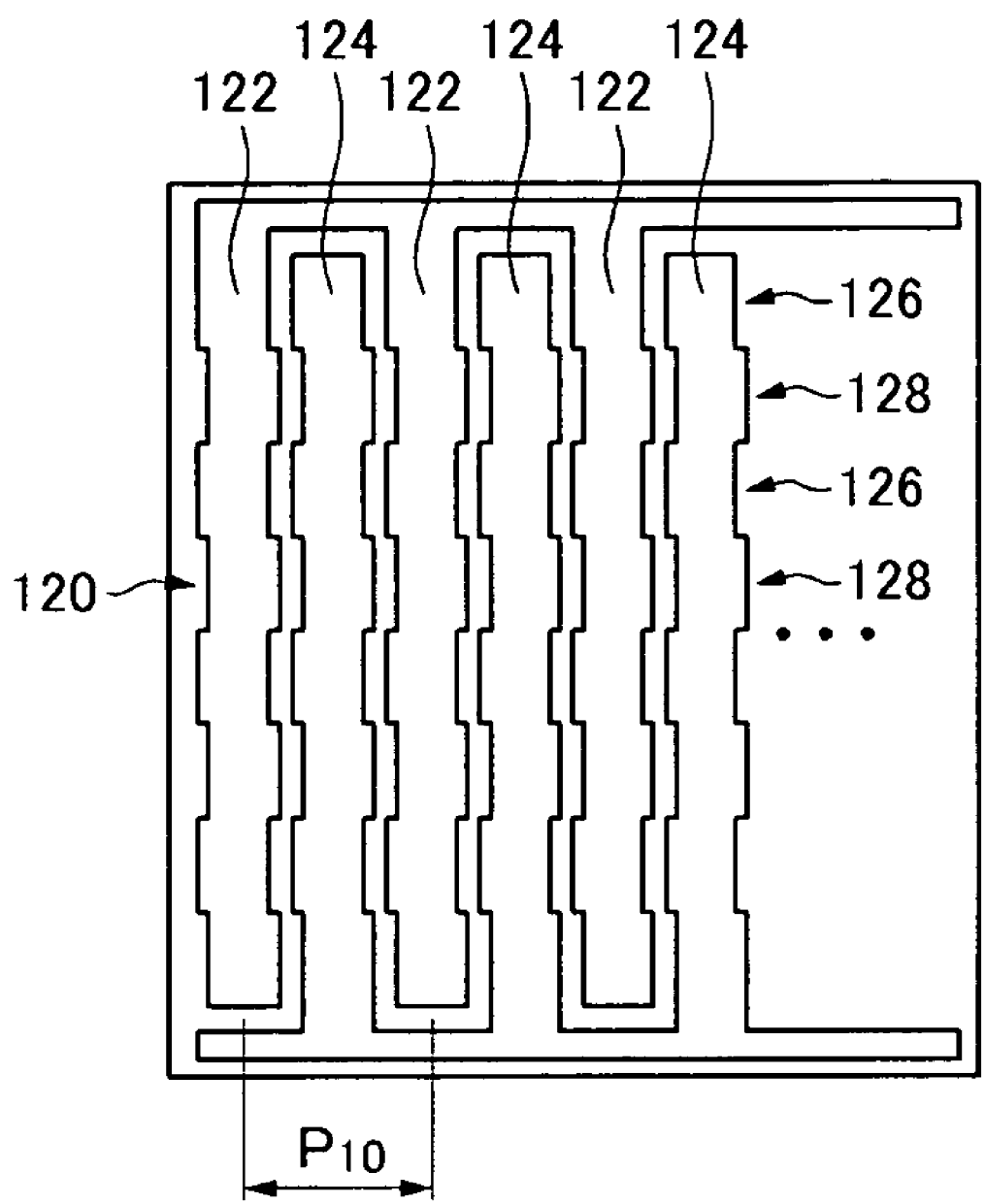
FIG. 11B is a plan view of a multi-viewpoint electrode layer of the three-dimensional display device according to the seventh exemplary embodiment of the present invention.

FIGS. 11A and 11B are plan views that respectively show a 2-viewpoint electrode layer 110 and a multi-viewpoint electrode layer 120 of a three-dimensional display device according to a seventh embodiment of the present invention.

As shown in FIG. 11A, first electrodes 112 are arranged on the 2-viewpoint electrode layer 110 at regular intervals and are connected electrically to each other, and second electrodes 114 are arranged between the first electrodes 112 and are electrically connected to each other. In this case, the 2-viewpoint electrode layer 110 includes first rows 116 and second rows 118 which are alternately and repeatedly arranged.

The first and second electrodes 112 and 114 are alternately and repeatedly arranged in the first rows 116 and have a first pitch $P_9$, and they are alternately and repeatedly arranged in the second rows 118 having a pattern that is eccentric to (or offset from) the pattern of the first rows 116.

As shown in FIG. 11B, third electrodes 122 are arranged on the multi-viewpoint electrode layer 120 at regular intervals, and they are electrically connected to each other. Fourth electrodes 124 are arranged between the third electrodes 122 and are electrically connected to each other.

In this case, the multi-viewpoint electrode layer 120 includes third rows 126 and fourth rows 128 that are alternately and repeatedly arranged. The third and fourth electrodes 122 and 124 are alternately and repeatedly arranged in the third rows 126 having a second pitch $P_{10}$, and they are alternately and repeatedly arranged in the fourth rows 128 having a pattern that is eccentric to (or offset from) the pattern of the third rows 126.

A second pitch $P_{10}$ of the third electrodes 122 and the fourth electrodes 124 is larger a first pitch $P_9$ of the first electrodes 112 and the second electrodes 114.

With the structure described above, a driving voltage is applied to the 2-viewpoint electrode layer 110 in the first mode, and to the multi-viewpoint electrode layer 120 in the second mode. Accordingly, the user can see a three-dimensional 2-viewpoint or multi-viewpoint image.

With the three-dimensional display device including the 2-viewpoint electrode layer 110 and the multi-viewpoint electrode layer 120 described above, vertical interference patterns according to the stripe pattern of the electrodes are diminished, and the visible range may also become larger. Thus the user can see a three-dimensional image more comfortably.

As described above, according to the three-dimensional display device and the driving method of the present invention, the user can see the three-dimensional multi-viewpoint image that enables a wide visible range, and a 2-viewpoint image that has higher resolution, selectively.

In particular, the three-dimensional display device according to the present invention can be adapted more easily to display devices that can be viewed by two or more persons at the same time, such as monitors, televisions, displays for a vehicle, etc.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three-dimensional display device comprising:
an image display unit having a first resolution; and
a light control unit facing the image display unit, wherein the light control unit comprises
a first substrate, and a second substrate facing the first substrate,
a 2-viewpoint electrode layer and a multi-viewpoint electrode layer located between the first and second substrates, wherein the 2-viewpoint electrode layer and the multi-viewpoint electrode layer are configured to respectively provide stereoscopic images having a second resolution and a third resolution that are both different from the first resolution, and
a liquid crystal layer located between the first and second substrates,
wherein the 2-viewpoint electrode layer comprises:
first electrodes and second electrodes alternately and repeatedly arranged with a first pitch;
a first connection electrode electrically connecting the first electrodes to each other;
a second connection electrode electrically connecting the second electrodes to each other;
first rows on which the first and second electrodes are alternately and repeatedly arranged in a pattern; and
second rows that are alternately and repeatedly arranged with the first rows, the first and second electrodes being formed on the second rows in a pattern that is opposite to the pattern of the first rows, and
wherein the multi-viewpoint electrode layer comprises:
third electrodes and fourth electrodes alternately and repeatedly arranged with a second pitch, the second pitch being larger than the first pitch;
a third connection electrode electrically connecting the third electrodes to each other;
a fourth connection electrode electrically connecting the fourth electrodes to each other;
third rows on which the third and fourth electrodes are alternately and repeatedly arranged in a pattern; and
fourth rows that are alternately and repeatedly arranged with the third rows, the third and fourth electrodes being formed on the fourth rows in a pattern that is opposite to the pattern of the third rows.

2. The three-dimensional display device of claim 1, wherein the image display unit includes sub-pixels, two of the sub-pixels correspond to each of the first and second electrodes that are adjacent to each other, and at least three of the sub-pixels correspond to each of the third and fourth electrodes that are adjacent to each other.

3. The three-dimensional display device of claim 1, wherein the image display unit includes sub-pixel groups, each sub-pixel group including two sub-pixels, two of the sub-pixel groups correspond to each of the first and second electrodes that are adjacent to each other, and at least three of the sub-pixel groups correspond to each of the third and fourth electrodes that are adjacent to each other.

4. The three-dimensional display device of claim 1, wherein the image display unit includes pixels, each pixel including red, green, and blue sub-pixels, two of the pixels correspond to each of the first and second electrodes that are adjacent to each other, and at least three of the pixels correspond to each of the third and fourth electrodes that are adjacent to each other.

5. The three-dimensional display device of claim 1, wherein the first, second, third, and fourth electrodes have stripe patterns.

6. The three-dimensional display device of claim 1, wherein the liquid crystal layer is located between the 2-viewpoint electrode layer and the multi-viewpoint electrode layer.

7. The three-dimensional display device of claim 1, wherein the image display unit includes sub-pixels, wherein the light control unit has alternately arranged interception portions and transmission portions, wherein each of the transmission portions corresponds to two of the sub-pixels when a data voltage is applied to the 2-viewpoint electrode layer, and wherein each of the transmission portions corresponds to four of the sub-pixels when a data voltage is applied to the multi-viewpoint electrode layer.

8. The three-dimensional display device of claim 1, wherein the image display unit includes sub-pixel groups, each sub-pixel group including two sub-pixels, wherein the light control unit has alternately arranged interception portions and transmission portions, wherein each of the transmission portions corresponds to two of the sub-pixel groups when a data voltage is applied to the 2-viewpoint electrode layer, and wherein each of the transmission portions corresponds to four of the sub-pixel groups when a data voltage is applied to the multi-viewpoint electrode layer.

9. The three-dimensional display device of claim 1, wherein the image display unit includes pixels, each pixel including red, green, and blue sub-pixels, wherein the light control unit has alternately arranged interception portions and transmission portions, wherein each of the transmission portions corresponds to two of the pixels when a data voltage is applied to the 2-viewpoint electrode layer, and wherein each of the transmission portions corresponds to four of the pixels when a data voltage is applied to the multi-viewpoint electrode layer.

10. The three-dimensional display device of claim 1, wherein the light control unit further comprises a common electrode layer located on an inner surface of the first substrate, the 2-viewpoint electrode layer and the multi-viewpoint electrode layer are located on an inner surface of the second substrate, the liquid crystal layer is located between the common electrode layer and the 2-viewpoint electrode layer or between the common electrode layer and the multi-viewpoint electrode layers, and an insulation layer is located between the 2-viewpoint electrode layer and the multi-viewpoint electrode layer.

11. The three-dimensional display device of claim 10, wherein the first and second electrodes correspond to first transmission portions, the third and fourth electrodes correspond to second transmission portions, and the common electrode layer is formed as a single-body electrode.

12. A three-dimensional display device comprising:
an image display unit; and
a light control unit facing the image display unit, wherein the light control unit comprises
a first substrate, and a second substrate facing the first substrate,
a 2-viewpoint electrode layer and a multi-viewpoint electrode layer located between the first and second substrates, and
a liquid crystal layer located between the first and second substrates wherein the 2-viewpoint electrode layer comprises:
first electrodes and second electrodes alternately and repeatedly arranged with a first pitch;
a first connection electrode electrically connecting the first electrodes to each other;
a second connection electrode electrically connecting the second electrodes to each other;
first rows on which the first and second electrodes are alternately and repeatedly arranged in a pattern; and
second rows that are alternately and repeatedly arranged with the first rows, the first and second electrodes being formed on the second rows in a pattern that is opposite to the pattern of the first rows,
and wherein the multi-viewpoint electrode layer comprises:
third electrodes and fourth electrodes alternately and repeatedly arranged with a second pitch, the second pitch being larger than the first pitch;
a third connection electrode electrically connecting the third electrodes to each other;
a fourth connection electrode electrically connecting the fourth electrodes to each other;
third rows on which the third and fourth electrodes are alternately and repeatedly arranged in a pattern; and
fourth rows that are alternately and repeatedly arranged with the third rows, the third and fourth electrodes being formed on the fourth rows in a pattern that is opposite to the pattern of the third rows.

13. A three-dimensional display device comprising:
an image display unit; and
a light control unit facing the image display unit, wherein the light control unit comprises
a first substrate, and a second substrate facing the first substrate,
a 2-viewpoint electrode layer and a multi-viewpoint electrode layer located between the first and second substrates, and
a liquid crystal layer located between the first and second substrates wherein the 2-viewpoint electrode layer comprises:
first electrodes and second electrodes alternately and repeatedly arranged with a first pitch;
a first connection electrode electrically connecting the first electrodes to each other;
a second connection electrode electrically connecting the second electrodes to each other;
first rows on which the first electrodes and the second electrodes are alternately and repeatedly arranged in a pattern; and
second rows that are alternately and repeatedly arranged with the first rows and are formed in a pattern that is offset from the pattern of the first rows,
and wherein the multi-viewpoint electrode layer comprises:
third electrodes and fourth electrodes alternately and repeatedly arranged with a second pitch, the second pitch being larger than the first pitch;
a third connection electrode electrically connecting the third electrodes to each other;
a fourth connection electrode electrically connecting the fourth electrodes to each other;
third rows on which the third electrodes and the fourth electrodes are alternately and repeatedly arranged in a pattern; and
fourth rows that are alternately and repeatedly arranged with the third rows and are formed in a pattern that is offset from the pattern of the third rows.

14. A driving method of a three-dimensional display device including an image display unit having a first resolution and a light control unit comprising first and second substrates facing each other, a 2-viewpoint electrode layer and a multi-viewpoint electrode layer arranged between the first and second substrates, and a liquid crystal layer located between the first and second substrates, the method comprising:
applying a data voltage for separating left and right eye images to the 2-viewpoint electrode layer, which comprises first electrodes and second electrodes alternately and repeatedly arranged with a first pitch, a first connection electrode electrically connecting the first electrodes to each other, a second connection electrode electrically connecting the second electrodes to each other, first rows on which the first and second electrodes are alternately and repeatedly arranged in a pattern, and second rows alternately and repeatedly arranged with the first rows, the first and second electrodes being formed on the second rows in a pattern that is opposite to the pattern of the first rows, while a reference voltage is applied to the multi-viewpoint electrode layer in a first mode in which the three-dimensional display device displays a 2-viewpoint image having a second resolution different from the first resolution; and
applying a data voltage for separating multi-viewpoint images to the multi-viewpoint electrode layer, which comprises third electrodes and fourth electrodes alternately and repeatedly arranged with a second pitch, the second pitch being larger than the first pitch, a third connection electrode electrically connecting the third electrodes to each other, a fourth connection electrode electrically connecting the fourth electrodes to each other, third rows on which the third and fourth electrodes are alternately and repeatedly arranged in a pattern, and fourth rows that are alternately and repeatedly arranged with the third rows, the third and fourth electrodes being formed on the fourth rows in a pattern that is opposite to the pattern of the third rows, while the reference voltage is applied to the 2-viewpoint electrode layer in a second mode in which the three-dimensional display device displays a multi-viewpoint image having a third resolution different from the first resolution.

15. The driving method of claim 14, wherein
the first connection electrode constitutes a first electrode set with the first electrodes, the second connection electrode constitutes a second electrode set with the second electrodes, the third connection electrode constitutes a third electrode set with the third electrodes, the fourth connection electrode constitutes a fourth electrode set with the fourth electrodes, said applying the data voltage for separating the left and right eye images comprises applying the data voltage for separating the left and right eye images to the first electrode set or the second electrode set while the reference voltage is applied to the third electrode set and the fourth electrode set in the first mode, and said applying the data voltage for separating the multi-viewpoint images comprises applying the data voltage for separating the multi-viewpoint images to the third electrode set or the fourth electrode set while the reference voltage is applied to the first electrode set and the second electrode set in the second mode.

16. A driving method of a three-dimensional display device including an image display unit having a first resolution and a light control unit comprising first and second substrates facing each other, a 2-viewpoint electrode layer and a multi-viewpoint electrode layer located between the first and second substrates, a liquid crystal layer located between the first and second substrates, and a common electrode layer facing the liquid crystal layer, the method comprising:

applying a data voltage for separating left and right eye images to the 2-viewpoint electrode layer, which comprises first electrodes and second electrodes alternately and repeatedly arranged with a first pitch, a first connection electrode electrically connecting the first electrodes to each other, a second connection electrode electrically connecting the second electrodes to each other, first rows on which the first and second electrodes are alternately and repeatedly arranged in a pattern, and second rows alternately and repeatedly arranged with the first rows, the first and second electrodes being formed on the second rows in a pattern that is opposite to the pattern of the first rows, while a reference voltage is applied to the common electrode layer in a first mode in which the three-dimensional display device displays a 2-viewpoint image having a second resolution different from the first resolution; and applying a data voltage for separating multi-viewpoint images to the multi-viewpoint electrode layer, which comprises third electrodes and fourth electrodes alternately and repeatedly arranged with a second pitch, the second pitch being larger than the first pitch, a third connection electrode electrically connecting the third electrodes to each other, a fourth connection electrode electrically connecting the fourth electrodes to each other, third rows on which the third and fourth electrodes are alternately and repeatedly arranged in a pattern, and fourth rows that are alternately and repeatedly arranged with the third rows, the third and fourth electrodes being formed on the fourth rows in a pattern that is opposite to the pattern of the third rows, while the reference voltage is applied to the common electrode layer in a second mode in which the three-dimensional display device displays a multi-viewpoint image having a third resolution different from the first resolution.

17. The driving method of claim 16, wherein the first connection electrode constitutes a first electrode set with the first electrodes, the second connection electrode constitutes a second electrode set with the second electrodes, the third connection electrode constitutes a third electrode set with the third electrodes, the fourth connection electrode constitutes a fourth electrode set with the fourth electrodes, said applying the data voltages for separating the left and right eye images comprises applying the data voltage for separating the left and right eye images to the first electrode set or the second electrode set while the reference voltage is applied to the common electrode layer in the first mode, and said applying the data voltage for separating multi-viewpoint images comprises applying the data voltage for separating the multi-viewpoint images to the third electrode set or the fourth electrode set while the reference voltage is applied to the common electrode layer in the second mode.

18. The driving method of claim 16, wherein the first and second electrodes correspond to first transmission portions, and the third and fourth electrodes correspond to second transmission portions.

* * * * *